April 13, 1943.   H. E. TREKELL   2,316,638
INDUCTION METER
Filed Jan. 23, 1942
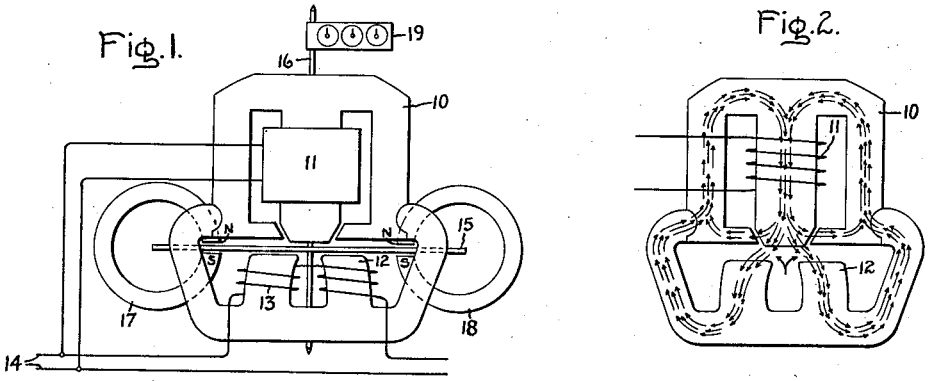
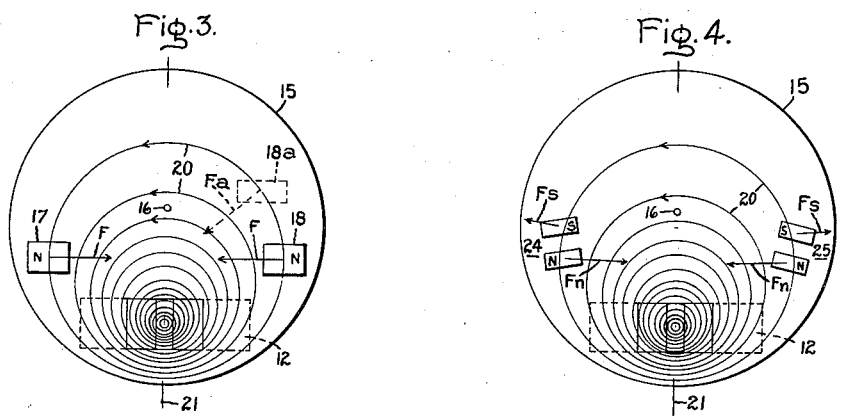
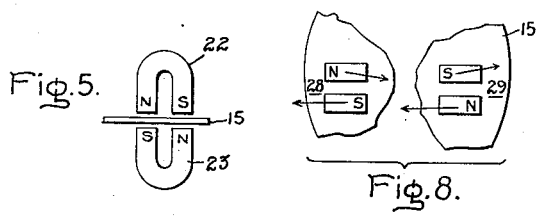
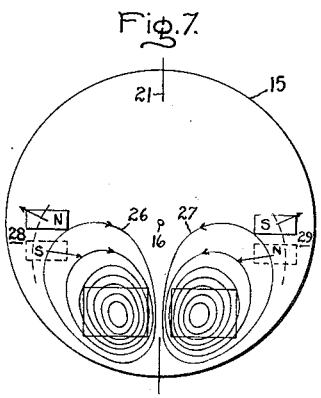
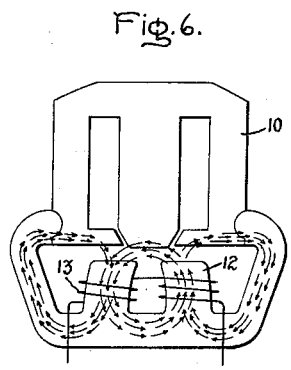
Inventor:
Harold E. Trekell,
by Harry E. Dunham
His Attorney.

Patented Apr. 13, 1943

2,316,638

UNITED STATES PATENT OFFICE 2,316,638

INDUCTION METER

Harold E. Trekell, Wakefield, Mass., assignor to General Electric Company, a corporation of New York Application January 23, 1942, Serial No. 427,967

5 Claims. (Cl. 171—264)

My invention relates to induction meters of the integrating type such as induction watthour meters which are provided with a rotary disk armature of conducting material acted upon by alternating driving and uni-directional damping fluxes.

In such a meter alternating current eddy currents are produced in the disk armature by the alternating driving fluxes and such eddy currents circulate through the unidirectional field of the damping magnets. The reaction of such eddy currents with the damping field produce forces in the disk at right angles to the direction of flow of eddy currents. These forces are proportional to the eddy currents and reverse in direction therewith. Such forces produce no useful result but may give rise to harmful vibrations of the disk armature, causing the rotating element to chatter in its bearings, producing noise even when the armature is not rotating and causing unnecessary wear in the bearings.

My invention concerns the use of a pair of drag magnets or drag magnet systems so placed with respect to the driving magnets about the disk armature that the forces above referred to are in directions to wholly or substantially cancel each other, whereby vibrations of the disk due to this cause are eliminated.

The features of my invention which are believed to be novel and patentable will be pointed out in the claims appended hereto. For a better understanding of my invention, reference is made in the following description to the accompanying drawing in which Fig. 1 illustrates the type of induction meter to which my invention is applicable and illustrating one embodiment of the invention. Fig. 2 illustrates the path of the voltage flux in a conventional meter magnetic circuit. The nature of the eddy currents produced in the disk by the voltage flux is represented in Figs. 3 and 4. Fig. 3 illustrates the proper placing of the driving and damping magnets where the drag magnets are like those shown in Fig. 1. Fig. 4 illustrates the proper placing of drag magnets relative to the driving magnet when using drag magnets of the form shown in Fig. 5. Fig. 6 shows the path of the current flux in the type of meter under discussion. Fig. 7 illustrates the nature of the eddy currents produced by the current flux and a judicious placing of the driving and drag magnets according to my invention, and Fig. 8 represents forces produced by the voltage flux eddy currents for drag magnet polarities as represented in Fig. 7.

In Fig. 1, I have represented an induction meter of the integrating type such as a watthour meter of reactive volt-ampere hour meter. The meter is provided with a voltage core 10 and voltage coil 11, a current core 12 and current coil 13. The voltage coil is connected across an alternating power circuit 14 and the current coil of the meter is connected in series with such circuit.

The voltage electromagnet produces a flux proportional to voltage which has a path indicated by the arrows in Fig. 2 and the current electromagnet produces a flux proportional to current which has a path indicated by the arrows in Fig. 6. The coils 11 and 13 are energized by alternating currents and it will be understood that the corresponding fluxes alternate in direction and that the illustrations, Figs. 2 and 6, indicate one of such direction only. In practice the voltage fluxes are always present whenever power is available and ordinarily do not vary greatly in magnitude, but are in general greater than full load current fluxes and cause the most difficulty as regard disk vibration. The current fluxes vary with the load current. The meter runs only when both fluxes are present. These fluxes cross the air gap shown and in such air gap is the disk armature 15 made of conducting material such as copper or aluminum. The armature is secured to a shaft 16 and is driven by the alternating fluxes with a torque proportional to their product for a given phase relation between them.

In order to measure the torque in terms of disk revolution the rotation of the armature is damped with a pair of drag magnet systems represented at 17 and 18 in Fig. 1. The drag magnets are permanent magnets and produce a constant uni-directional flux through the disk armature 15. The rotations of the armature are counted on a register 19 in whatever units are being measured, for example watthours.

In Figs. 3 and 4 I have represented plan views of the disk armature. The position of the driving magnets is represented as at the lower portion of the disk and the dotted line outline 12 may be taken to represent the position of the current core. The three magnet systems are positioned near the periphery of one half of the disk with the driving magnet system in the center. The light circular lines 20 which are drawn eccentric to a point centrally located with respect to the driving magnets represent the general direction and distribution of the eddy currents which are produced in the disk armature by the alternating voltage or potential flux. These currents reverse in direction and have a frequency equal to the frequency of the flux which produces them. These eddy currents are symmetrical or substantially so with respect to a center line 21 drawn through the center of the disk and the center of the driving magnet position. These eddy currents are most intense near the driving magnets and least intense on the side of the disk remote from the driving magnets as represented by the spacing between the lines 20.

At 17 and 18 I have indicated the proper position of the pole faces of the drag magnets of the horse shoe form shown in Fig. 1 with respect to the eddy current distribution shown for the purposes of my invention, where both drag magnets produce fluxes in the same direction through the disk. The arrows F represent the forces produced by the reaction of the eddy currents 20 and the damping fluxes at a given instant. The forces F are at right angles to the direction of the eddy currents cut by the damping flux. The eddy current may vary slightly in magnitude and direction within the damping flux area so that the arrows F may be taken as the resultant or average force produced. It is noted that the forces F are equal and opposite. They are equal because the two damping magnets are designed to produce equal damping fluxes. In case one damping magnet is slightly stronger than the other equality between the forces F may be obtained by slight adjustment of the damping magnets as by moving the stronger magnet to a point of weaker eddy current density. The forces F are opposed because the damping fluxes through the disk are in the same direction and the eddy currents are in the reverse direction on opposite sides of the disk where the drag magnets are placed and also the drag magnets are so positioned that the forces F, which occur at right angles to the direction of eddy current flow, are exactly in line. If, for example, the magnet 18 on the right in Fig. 3 were placed at 18a as indicated in dotted lines, it would produce the force Fa in which case the forces produced by interaction between the potential eddy currents and damping flux would no longer cancel. When the eddy currents reverse, the forces F reverse. Hence, in Fig. 3 the correct positioning of the drag magnets is represented in full lines to have the forces F cancel.

I may use drag magnets on opposite sides of the disk made each of a pair of small horse shoe shaped permanent magnets 22 and 23, as shown in the fragmentary view, Fig. 5. Such magnets produce uni-directional fluxes through the disk in opposite directions at closely adjacent points spaced apart in the circumferential direction of the disk. Fig. 4 represents approximately a correct polarity arrangement and disposition of such damping magnet systems where 24 and 25 may represent in outline the upper pole faces of a pair of such systems. In this arrangement, also, the drag magnet systems are symmetrically placed on opposite sides of the disk with respect to the center line 21. The average eddy current strength under the north poles of these magnets is more intense than under the south poles and hence the forces Fn produced thereby are somewhat greater than the forces Fs produced at the south poles. The forces Fn shown directed inwardly are equal and nearly opposed, but will have a very small remaining downward resultant component. The forces Fs shown directed outwardly are equal and nearly opposed but will have a small remaining upward resultant component. By adjusting the positions of the two drag magnet systems, the downward resultant component of the north poles can be made to substantially cancel the upward resultant component of the south poles. All of these forces reverse with reversal of the disk eddy currents.

Generally, it is not essential that the forces under consideration exactly cancel out to eliminate vibration but the resultant vibratory forces should be made sufficiently small that they will not vibrate the disk or rotor assembly. For example, if a relatively heavy disk armature is used, the need for exactly balancing the forces under consideration is reduced.

As previously mentioned, the forces resulting from interaction of the voltage or potential eddy currents and the drag magnet flux cause the greatest vibration if not balanced. This is because the voltage flux produced eddy currents are greatest and are always present whenever the meter is connected to the line even though no current is flowing in the current coil and the meter is not running.

In general, therefore, it is usually unnecessary to take into consideration the vibratory forces produced by the interaction between the current flux eddy currents and the drag magnet flux. In meters where the current flux is relatively large it may, however, be desirable to do so and when both potential and current flux eddy currents are to receive consideration the arrangement represented in Fig. 7 may be used.

In Fig. 7 I have represented the relative direction and distribution of the disk eddy currents for a heavy current flux. The eddy currents are represented by the closed lines 26 and 27. It will be noted that while these currents are symmetrical with respect to the center line 21, there are two groups which flow in reverse directions, those on the left flowing clockwise and those on the right counter-clockwise at the instant represented. The drag magnets 28 and 29 of the form shown in Fig. 5 have the same general relative position as previously described. However, the magnet at 28 is reversed relative to the magnet 24, Fig. 4, so that the north pole is in the weaker instead of in the stronger eddy current area. The relative direction and magnitude of the forces produced are represented by the arrows. It will be evident that the forces cancel out or may be made to do so.

If, now, we consider the effect of the magnets arranged as in Fig. 7, with respect to the potential eddy currents alone, the forces would be about as represented in Fig. 8. The forces in Fig. 8 largely but do not completely cancel. Similarly, the arrangement of the magnets as in Fig. 4 would largely but not completely cancel the forces due to the current flux eddy currents of Fig. 7. It will generally be sufficient to arrange the magnets with the polarities as represented in Fig. 4 and try different positions in the vicinity represented in Fig. 4, until the best results are obtained both for the potential flux alone and also with full load or higher current flux. The most satisfactory position will probably vary with meters of different types and, to a lesser extent, with meters of different current ratings. The forces produced by the current and voltage eddy currents vary in phase with phase variations between current and voltage.

It will be noted that the drag magnet systems are placed on the same half of the disk as the driving magnet system which gives preferable conditions for the elimination of the disk vibrating forces. So far as balancing the forces discussed herein are involved, in some instances the damping magnets could be moved to the other half of the disk. However, for reasons pointed out in U. S. Patent No. 2,272,748, granted Feb. 10, 1942, to I. F. Kinnard, assigned to the same assignee as the present invention, I prefer to keep the damping magnets as near to the driving magnets as possible.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An induction meter comprising a rotary disk of conducting material, an alternating current electromagnet producing alternating fluxes through the disk and a pair of permanent magnet systems for producing uni-directional fluxes through the disk, the pair of permanent magnet systems being located substantially symmetrically with respect to and on opposite sides of a line drawn through the center of the disk and center of the alternating current electromagnet position and on the disk center side of the electromagnet and said permanent magnet systems producing fluxes through the disk in such directions as to cause the forces produced on the disk by interaction between the alternating current eddy currents in the disk and the uni-directional fluxes therethrough to substantially cancel.

2. An induction meter having a rotary disk of conducting material, an electromagnet positioned near the periphery of the disk for producing alternating fluxes therethrough, a pair of permanent magnet systems for producing uni-directional fluxes through the disk, said pair of permanent magnet systems producing substantially equal uni-directional fluxes through the disk and located substantially symmetrically on opposite sides of a line drawn through the center of the disk and the electromagnet position and on the same half of the disk as the electromagnet and towards the disk center side of the electromagnet, said permanent magnet systems producing fluxes through the disk in such directions as to cause the forces on the disk produced by the reaction between the alternating eddy currents therein and the permanent magnet fluxes to substantially cancel.

3. An induction watthour meter having a disk armature of conducting material, an alternating current driving magnet system and a pair of permanent damping magnet systems all located near the periphery of the disk, said damping magnet systems producing substantially equal damping fluxes through the disk at spaced apart points located substantially equal distances from the driving magnet position and substantially equally distant from the center of the disk between the driving magnet and center of the disk, said damping magnet systems producing fluxes through the disk in such directions and positions that the tendency of the disk to vibrate due to interaction between the alternating current eddy currents in the disk and the damping magnet fluxes is minimized.

4. An induction meter having a rotary disk armature of conducting material, an alternating current driving magnet system including a voltage electromagnet located near the periphery of the disk for producing alternating driving fluxes therethrough and producing resulting alternating current eddy currents in the disk, a pair of C-shaped permanent drag magnets each having their opposite polarity pole pieces facing opposite surfaces of the disk and their yoke parts connecting said pole pieces about the outer edge of the disk so as to produce uni-directional fluxes therethrough, said pair of drag magnets producing substantially equal fluxes through the disk in the same direction at spaced apart points located substantially equally distant from the driving magnet system and substantially equally distant from the center of the disk between the driving magnet system and disk center such that the forces on the disk which are produced by reason of reaction between the voltage eddy currents in the disk and the damping fluxes substantially cancel.

5. An induction meter comprising a rotary disk armature of conducting material, a driving magnet system including a voltage magnet for producing alternating fluxes through and resulting eddy currents in the disk, a pair of permanent magnet systems for producing uni-directional damping fluxes through the disk, said magnet systems being spaced apart about the periphery of the disk on the same half of the disk and with the driving magnet system substantially midway between the damping magnet systems, each damping magnet system producing fluxes through the disk in opposite directions at closely adjacent points spaced apart in the circumferential direction of the disk, with the damping fluxes of each damping magnet system nearest the driving magnet system passing through the disk in the same direction, said arrangement being for the purpose of causing the disk forces which are due to the reaction between the damping fluxes and the voltage flux produced eddy currents to substantially cancel so as to minimize tendency to vibrate the disk.

HAROLD E. TREKELL.